United States Patent
Kaminsky

(10) Patent No.: US 10,447,711 B2
(45) Date of Patent: *Oct. 15, 2019

(54) SYSTEM AND METHOD FOR IDENTIFICATION OF AUTOMATED BROWSER AGENTS

(71) Applicant: White Ops, Inc., Brooklyn, NY (US)

(72) Inventor: Daniel Kaminsky, San Francisco, CA (US)

(73) Assignee: WHITE OPS INC., New York, NY (US)

(*) Notice: Subject to any disclaimer, the term of this patent is extended or adjusted under 35 U.S.C. 154(b) by 698 days.

This patent is subject to a terminal disclaimer.

(21) Appl. No.: 15/061,604

(22) Filed: Mar. 4, 2016

(65) Prior Publication Data

US 2016/0191554 A1    Jun. 30, 2016

Related U.S. Application Data

(63) Continuation-in-part of application No. 14/057,730, filed on Oct. 18, 2013, now Pat. No. 9,313,213.

(60) Provisional application No. 61/715,815, filed on Oct. 18, 2012.

(51) Int. Cl.
*H04L 29/06* (2006.01)
*G06F 21/31* (2013.01)

(52) U.S. Cl.
CPC .......... *H04L 63/1416* (2013.01); *G06F 21/31* (2013.01); *H04L 63/14* (2013.01); *H04L 63/1425* (2013.01); *G06F 2221/2133* (2013.01); *H04L 2463/144* (2013.01)

(58) Field of Classification Search
CPC .................................. H04L 63/12; G06N 7/00
See application file for complete search history.

(56) References Cited

U.S. PATENT DOCUMENTS 9,313,213 B2 * 4/2016 Kaminsky ................ G06N 7/00

* cited by examiner

*Primary Examiner* — Alan Chen
(74) *Attorney, Agent, or Firm* — Nadya Reingand; Yan Hankin

(57) ABSTRACT

Disclosed herein are methods and systems for evaluating web browser behavior to report on human versus non-human activity, based on varying analyses of detectable properties. By passively detecting the code of a webpage engaged by a browsing user, the present invention evaluates the browsing user's activity in order to predict the type of user with a degree of confidence. The predictions are formed by acquiring information on how a user loads, navigates, and interacts with a webpage and comparing that information with known and unknown properties in various control groups. If the prediction yields a high likelihood of automated activity, additional active detection may be performed. Reports are compiled by analysis servers and made available to the operators of webpages. By compiling performance metrics and informing operators of fraudulent versus normal activity, the invention combats malicious automated traffic directed at any aspect of a given webpage.

20 Claims, 3 Drawing Sheets

SYSTEM AND METHOD FOR IDENTIFICATION OF AUTOMATED BROWSER AGENTS

CROSS-REFERENCE TO RELATED APPLICATIONS

This patent application is a Continuation-in-Part of U.S. patent application Ser. No. 14/057,730, filed Oct. 18, 2013, which, in turn, claims priority to and incorporates fully by reference U.S. Provisional Patent Application No. 61/715,815, filed Oct. 18, 2012.

FIELD OF THE INVENTION

This invention relates to the general field of Internet communications software, and it has certain specific applications to the analytical evaluation of Internet communications.

BACKGROUND OF THE INVENTION

For a host of reasons, numerous individuals and organizations are actively engaged on a daily basis in sending malicious, automated traffic to web pages and other internet destinations, and making that traffic appear as if it that traffic is human and not automated. For example, the vast majority of revenue presently derived from Internet traffic results from paid advertising. Companies and individuals pay for the placement of advertisements on the Internet where they may be seen and interacted with by people who may be interested in learning about and purchasing their products. Given that these advertising interactions take place electronically and at a distance, it is possible for those interested in capturing some portion of the revenue spent on Internet advertising to employ automated software agents to defraud those paying for the advertising. This is done by making it appear as if advertisements have been viewed by humans who may be interested in a given product, where, in reality, a given advertisement has only been viewed or interacted with by malicious software, which exists only for the purpose of committing such acts of fraud.

Currently, there exist passive systems and methods which detect automation, or bot, differentials such as, for example, whether all content is loaded, or whether request rates match legitimate browsers. Detection of these differentials is helpful from a networking hardware perspective—one can implement the system on a network, interfere with nothing, and recover data. This data, however, is not necessarily high quality because, for example, legitimate human users might have unusual access patterns, caching layers prevents requests like automated bots might, and most importantly, bots are increasingly becoming full browsers thus matching many of these passive metrics quite frequently.

SUMMARY OF THE INVENTION

During the initial learning period, all browsing activity on a page (e.g. mouse clicks) can be split into groups based on their origin. For example, page requests coming from computers on protected government network are most likely submitted by humans, and will be categorized as such. Requests coming from IP addresses belonging to known bot networks have a low probability of being human interaction and will be categorized in a separate group.

Data collection by the analysis server is made possible by code snippets inserted (or injected) into the page code by the web server before the page is sent to the user's browser. This code performs data collection about the user's interaction with the web page and transmits the collected data to the analysis server via multiple communication channels.

At the bot detection stage, data transmitted to the analysis server is checked if it matches a pattern characteristic for human interaction or automated bot submission pattern. The typical elements of a bot pattern include, but are not limited to, (1) interaction with invisible elements of the page, (2) missing properties of an interaction (for example, a mouse click), (3) wrong interaction timing (for example, a mismatch between mouse down and mouse up timestamp), (4) interface behavior being atypical for human (for example, mouse moving along an absolutely straight line), (5) wrong page element property due to the fact that a bot failed to guess correctly what data will be entered by a browser during the page load, (6) a set of available communication channels does not match the set characteristic for the typical human-operated computer. The results of the detection are provided to the customer of the analysis system in real time or, alternatively, as a report for a given time period.

The present invention thus generally comprises methods and systems for detecting automated browser agents, comprising the following steps: inserting a means for detecting information into a page code before a page is sent to a user's browser, sending the page to a user's browser, wherein emissions are sent from one or more plugins via one or more channels, the emissions capturing client execution environment data without requiring a browser interaction and causing immediate and continued data collection of the client execution environment data, transmitting via asynchronous posts the client execution environment data to an analysis server, wherein the analysis server compares the client execution environment data with a first database storing pattern characteristics for humans, a second database storing pattern characteristics for automated browser agents, and a third database storing pattern characteristics which are unclear as to whether performed by a human or a bot, forming a report on automated browser agent activity based on a qualitative evaluation of performance metrics collected, calculating a probability of the user being an automated browser agent, where the probability is calculated based on the report and the comparisons with all three databases, and initiating a secondary detection if the reported probability of the user being an automated browser agent guarantees a presence of automated agent activity, the secondary detection comprising active probing (rather than the passive probing of the earlier detection step).

In some aspects, the method further comprises calculating a second probability of the user being a human.

In some aspects, the secondary detection comprises detection of properties to classify automated agents by type. In some aspects, the secondary detection comprises detection of non-native code modifying a function of a browser. In some aspects, the secondary detection comprises detection of network-resident modifications to a function of a browser. In some aspects, the secondary detection comprises detection of content injection.

In some aspects, the client execution environment data comprises emulated input. In some aspects, the client execution environment data comprises JavaScript event loops. In some aspects, the client execution environment data comprises a nature of character insertion. In some aspects, the client execution environment data comprises optimization of JavaScript. In some aspects, the client execution environment data comprises an ability to connect with a malware detection engine. In some aspects, the client execution environment data comprises post-exploitation defenses. In some aspects, the client execution environment data comprises data regarding a handling of cookies. In some aspects, the client execution environment data comprises properties of TCP and UDP traffic. In some aspects, the client execution environment data comprises an availability of server-side API technology.

In some aspects, the active probing comprises an active use of pop-ups. In some aspects, the active probing comprises intrusive font detection. In some aspects, the active probing comprises nonlinear sampling. In some aspects, the active probing comprises forcing a bot to self-announce to arbitrary endpoints.

In some aspects, the secondary detection comprises detection of viewability modulation.

DETAILED DESCRIPTION OF THE PREFERRED EMBODIMENT

Definitions

Figure 1:
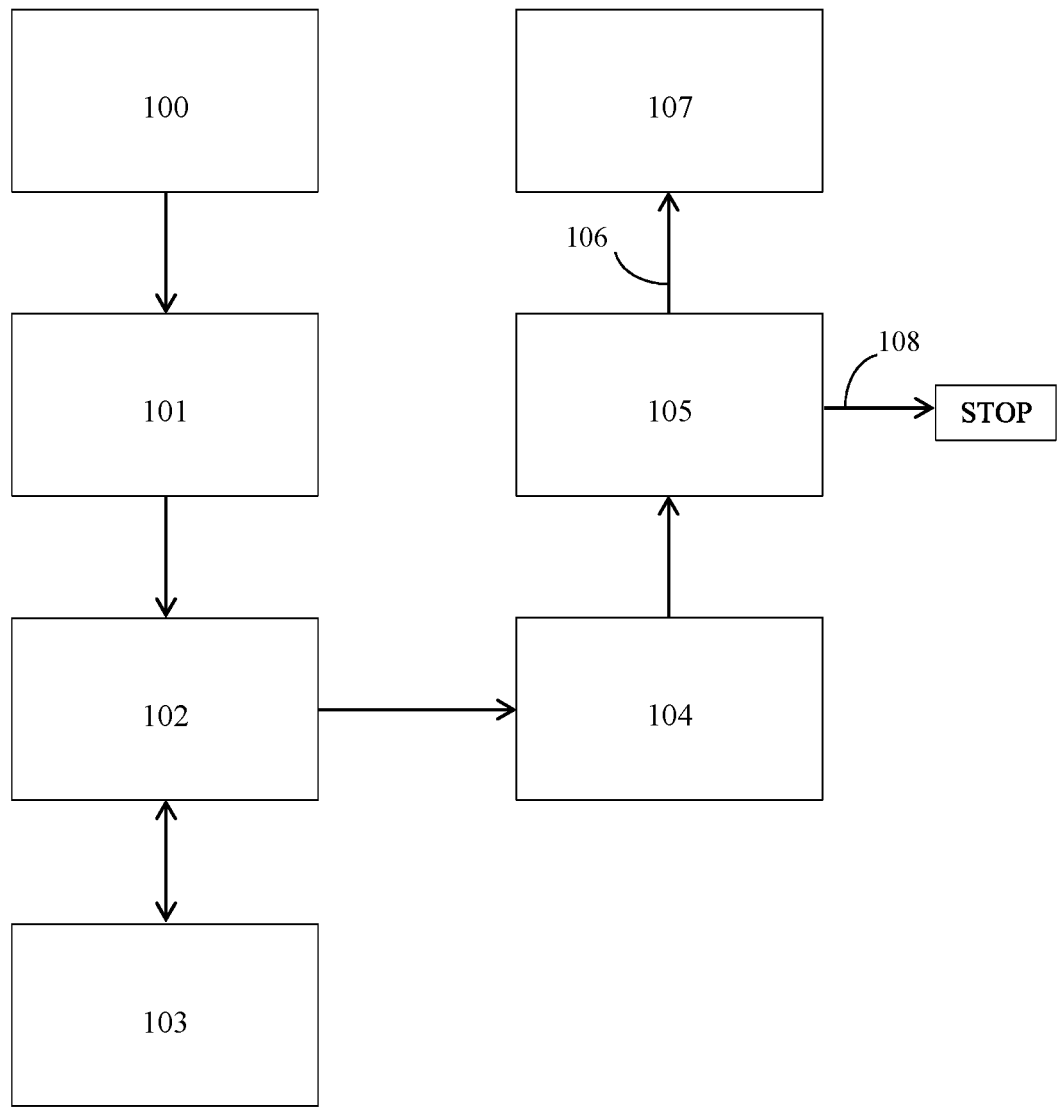
FIG. 1 illustrates an example of the deployment of the present invention in a typical webpage scenario.

HTML (HyperText Markup Language). The primary programming language used for creating, transmitting and displaying web pages and other information that can be displayed in an Internet browser.

HTTP (Hypertext Transfer Protocol). The standard World Wide Web client-server protocol used for the exchange of information (such as HTML documents, and client requests for such documents) between a Web browser and a Web server. HTTP includes several different types of messages which can be sent from the client to the server to request different types of server actions. For example, a "GET" message, which has the format GET <URL>, causes the server to return the content object located at the specified URL.

Means for detecting. This term includes, but is not limited to, inserting a code snippet into a page HTML code before the page is sent to a browser.

The present invention discloses both passive and active probing models for the collection of qualitative metrics evaluating human-driven browsing activity against automated agent-driven (i.e. bot-driven) activity over a computer network. After a first round of passive probing, one or more rounds of active probing may be performed, which results in collection of a deeper reservoir of differentials between the two types of activity, and furthermore, differentials between classes within each type (compared to the differentials used in the current state of the art). In contrast to prior art methods of collecting content, the method disclosed herein passively probes first and then actively loads additional code and sends additional content on the wire to different and new locations ("active probing," or "intrusive detection"). JavaScript (JS) and Flash, for example, can be actively probed by the claimed system and method in order to detect specific bot activity and assemble additional reports based on qualitative performance metrics.

The claimed system and method assumes that legitimate human users, by in large, have JavaScript and other active scripting technologies, including but not limited to Flash, enabled and are using full web browsers. As such, a non-browser bot will simply fail to execute any queries that are at all dependent on JavaScript. The trap set for potential attackers is that, in evading this exceedingly reliable detection mechanism, they must now actually emulate all parts of the browser. And because a real JavaScript environment—as well as other scripting technologies—has an infinite amount of properties that may be probed, the attacker must emulate every property potentially probed. Thus, previously unnoticed information and resulting discrepancies become exposed. For example, when a mouse event is falsified, one timestamp associated with that event may become absent; an auxiliary field may be set to a unique and incorrect value; or a mouse event rate is too stable or too unstable. Some examples of properties that can be probed include but are not limited to: (1) the precise relationship of mouse events seen on a page (e.g., a click associated with a mouse-up or mouse-down movement, agreement between the two timestamps associated with each mouse event, as discussed above, etc.); (2) the rate that Flash is updated (e.g., per second) and the reliability of its calls; (3) operation of Flash stages in all locations of operation (e.g., operating in sync); and (4) the speed of completing a graphical update (e.g. to a <CANVAS> element), which might indicate the type of hardware used or the active updating of a real user screen.

Other properties may include: direct signs of operating systems properties rarely seen among legitimate users, a strong desynchronization between measurements (particularly input measurements) that otherwise might be identical or near identical (e.g., two timestamp sources theoretically reading from the same clock that should be within a millisecond of each other, but actually are widely divergent), the unavailability of "server-side API" technology, the ability to execute certain attacks, behaviors, or performance increases that otherwise are modulated or suppressed by the execution environment, incorrect or inconsistent language properties, inconsistencies in cryptographic subsystems, misspellings or misorderings of properties across the browser stack, active efforts by components to resist mechanization, active efforts by bot operators to reduce bandwidth or performance costs of their bots for any reason, artifacts of attempts to avoid audiovisual detection by the legitimate operators of the system, performance changes due to the presence or absence of debugging frameworks in a "test" environment, incorrect performance or sizing of character rendering, particularly in the context of particular fonts, "impossible" errors, i.e., those errors that cannot happen in proper execution environments (e.g., the absence of a property that can usually only be changed), direct exposure of methods or properties known to only occur in specific bot driven environments (e.g., the actual name of the bot driven environment), impossible hardware platforms given the nature of the rest of the stack (e.g., the detection of desktop processors on a "mobile" operating system), the detection of functionality and/or dependencies associated with virtualization platforms or known botnets, alterations in reported hardware that only occur during emulation or debugging of that hardware, non-default feature keys or flags that make bots run smoother but have no known benefits to human users (or the default settings in common compilation modes which have no known benefits to human users), rare error paths that fail differently during automation (possibly with different errors, possibly faster or slower), incorrect or suspicious properties of pseudo random number generation (both in content and in speed), network address properties implying membership in a large "zoo" of hosts participating in coordinated fraud, properties of TCP and UDP traffic (measuring speed, size, and interpacket timing) implying non-local control, possibly automated or possibly interactive characteristics of interactive access (both input and output) that imply acceleration to support a non-local user, detection of "private browsing" not only being used, but being used in a manner suggestive of bot fraud (particularly if the "private browsing" is suspiciously not sufficiently private), claimed functionality that either does not actually exist, or exists but is implemented by emulation, or exists but does not handle errors properly (e.g., a module might be loaded on demand but until then JavaScript may see it as unloaded while a legitimate browser would have preloaded it), incompatibility with obscure "layer crossing" features like preloading, incorrect handling of cookies particularly when malformed and when particular flags require special aspects of the browser security model to be very carefully followed (e.g., an inability to correctly managed http-only and secure cookies, or bugs in path handling), missing post-exploitation defenses (a legitimate compile might have values randomized while the bot build does not), other violations of strict ordering or offsets (e.g., there are integers that are meaningless handles to important functionality, but the integers are usually always the same—if they are not, this may indicate a categorized use), presence of elements or sources highly associated with bot behavior (e.g., particular injections receiving commands from known malicious C&C servers, possibly injected server side, possibly injected client side), an inability to connect or interoperate with resources known to be malware detection engines (e.g., an anti-malware domain might be blocked system-wide by a certain bot, but another anti-malware domain not blocked might detect that), detection of dynamic behavior on sites known to be static, the presence of data (both integral to the system, and via sensors) strongly associated with legitimate human interaction ("human prints") as a contrary sign to bot activity, "home page detection" showing that this was the first page loaded by a particular process, excessive or inefficient optimization of JavaScript (e.g., as might happen if a bot was altering the compiler for real time instrumentation of detection/obfuscated code), de-obfuscation detection, the presence or absence of plugins otherwise guaranteed to be or not to be on a given platform, inhumanly consistent interaction patterns beyond a single session (e.g., if a perfectly human pattern is being replayed perfectly, then that browser is not a human), device inconsistent interactions (e.g., touch events on a device known not to have touch), inappropriate power management behavior, detection of an invisible resource receiving events that require visibility (as would happen with injection), events with incorrect trust flags driving behavior, suspicious inter-event timing (content loading too quickly or too slowly, interactions being successful too quickly or too slowly, or in the wrong order), unusual observer behavior (observers batch up events, perhaps too many are batched, perhaps too few are batched), incorrect behavior of JavaScript event loops, suspicious window names or window opener access patterns implying globally disabled popups and a driver abusing that, information arriving via copy/paste or direct injection rather than typing (i.e., the nature of character insertion can be noted), mouse events but no touch events on devices that have no mouse and do have touch (or more generically, detection of emulated input).

When there is a calculated probability implying a confidence that a bot (particularly a new bot) is being seen and there is knowledge that possible corruption is not going to impact a legitimate user who might complain or be otherwise affected, the present invention further comprises a step of selecting at least one more intrusive test comprising active probing (i.e., requiring a browsing user to interact or react, rather than passively reading the environment). Such more intrusive tests might not only detect a bot, but identify the class or type of bot, and find more properties that can then be used to non-intrusively identify the bot in future encounters. In addition, this additional active probing test may detect other forms of non-native code modifying the function of a browser, not just automating the browser (e.g., toolbars injecting content), as well as network-resident modifications to the function of a browser, including proxies that alter an appearing origin of a browser, and network-resident content injection.

An example of a more intrusive (i.e. active probing) test may be the active use of popups to see if popups are allowed by default on all domains (iframes may be used to detect if popups are allowed on one domain versus many). Another example may be the use of intrusive font detection to determine the OS platform accurately (which may or may not be limited to presumptive bots). Also to be noted, inconsistent results from probes across multiple environments may indicate bot activity—HTML5, Flash, Java, and more all have unique environmental measurement methods that always agree for legitimate users. Memory behavior and pressure may be measured alongside event loop properties to detect a browser with many tabs simultaneously interacting with the web, stressing the same processor (see various multitenant attacks). The coexistence of multiple "bot markers" may identify a particular bot, or may combine to allow multiple markers that would not individually imply a degree of bot activity, to be marked bot in this context. Machine learning in particular may be used to determine unexpected relationships between known botsigns and accidental variants, and nonlinear sampling may be used to extract more data from unusual user agents (most of which are bots, some of which are not). Given knowledge of a bot presence, self-announcement to arbitrary endpoints may be possible—while the system of the present invention may not know the bot's identity for all possible providers, it can force the bot to associate its purloined credentials with an explicit (possibly encrypted) marker to other parties. This may extend to IT staff at an organization infested with bots; such "remediation links" would internally announce (possibly not with cookies, but with Single Sign-On/Windows credentials) that a machine was infected and required cleaning. Remediation links could also link to local web servers operated by an antivirus, forcing more aggressive analysis and cleanup or even providing external validation of bot presence or a copy of the malware in question under the terms of service of the Antivirus (or toolbar) provider.

The active detection of the present invention may further comprise detection of generally subsequent human behaviors too fast for humans (milliseconds) or too slow for humans (tens of minutes), particularly if co-occurrence between events is generally guaranteed by an interactive path but may be arbitrarily interrupted outside of direct interactive behavior. It may also comprise the use of browser emulation mode manipulation to reacquire useful browser modes for bot detection and viewability verification. Such manipulations include but are not limited to behaviors around iframes, object embedding modes, of which there are several, origin protocol manipulation, of which there are subtle differences in various browsers, and document declaration modes with "quirks" compatibility variants. In some circumstances, the occurrence or lack of paint events/side effects may be detected as well, and not merely as whether or not such an event occurred, or just when or how long it took. In fact, the actual count of events may vary by rendering mode (which bots may manipulate, since they don't wish to be displayed).

The present invention may further actively detect viewability modulation (beyond what browsers are actively designed to declare), which may include "fast paths" that subvert rendering or eventing according to actual displayed position on the top viewport, actual size on the top viewport, whether there are other elements occluding the content in question, or whether there are other elements transforming the content in question. This step may also include detection of manipulation at the OS compositor or display manager layer (e.g., whether the content is being displayed on a virtual screen that does not physically exist). Such detection may occur entirely via screen measurement or multiscreen declarations in the core browser or via plugins, by design or by artifact.

The present invention allows the differentiation of malicious automated agents from humans by gathering and processing elements of a given user's interaction with a web page that occurs after a web page has been loaded by the user, and comparing those elements to reference results drawn from a control group. This is achieved in part by placing certain elements within the code of a web page prior to it being loaded by a given user, so that those elements may be evaluated after that user has loaded that web page.

The elements monitored and evaluated fall into two main classes of data: (1) content that exists (or is absent, i.e. does not exist) at page load, and (2) content that is generated over time (or timing) as the page persists in potentially usable form. Content that exists at page load encompasses bits, or parts of code, which are accessible or visible even though they should not be. This content consists of JavaScript ("DOM") elements which exist (or do not exist) due to the manner in which the browser is hosted. For example, if loaded by a human user, some bits would be inaccessible for security or other reasons; however, if loaded by an automated agent or bot, the same bits would be accessible). For another example, automated agents also constantly and actively inject bot-specific configurations in manners that are different from the behavior of the browser or the site being monitored. In general, aspects of a shell (e.g. Internet Explorer, Firefox, Safari, Chrome) are exposed to the JavaScript environment in an engine (e.g. Trident, Gecko, Webkit), and bots, being shells themselves, either expose too much information or too little information, and the discrepancies are captured by the active probing model of the present invention. These captured characteristics include, but are not limited to, HTML5 standards compliance, patterns in error handling (including information about what language the errors are translated into), and browser elements injected by the browser shell rather than the native object (different objects are injected or not injected based on the host, which could be, e.g., Internet Explorer or an automated agent (i.e. bot) framework).

The second class of data, content that is generated over time (or timing), generally refers to elements that vary due to interaction with a human user. These might be events that take incorrect amounts of time, relative to one another, because there is no actual human for whom the events are being performed. Timing attacks work against more than just cryptographic systems. It is often faster, but sometimes much slower, to express the result of a browser operation (of which there are hundreds of thousands) when there is no screen to update and no user to inform. For example, error messages can be suppressed, or the graphics hardware might notice that no pixels require update. By measuring absolute and relative timing differentials, bots expose themselves to the claimed system and method. Tests are generated on the infinite number of such differentials, hosted quite infrequently (since the purpose of bots is to operate at scale, this does not have to occur often), and thus an attacking developer faces the obstacle of forging credentials he does not necessarily know in advance.

The present invention also collects data regarding any given user's interaction with a webpage after it has been loaded. This data includes, but is not limited to, mouse activity (where the mouse is located, number of updates per second, geometry of mouse movement, ancillary data to mouse event data—i.e. the metadata associated with a mouse click, scroll up, scroll down, or scroll over, the correlation between mouse events, etc.), missing data when an event is incorrectly synthesized, keyboard activity, accelerometer data, scroll events, average read and visit time, page update rate (animation rate has a strong correlation with visibility of a page), and supported network protocols and web standards (bots can break communication pathways).

The user interaction data elements are compared with reference results drawn from a set of three different control groups: (1) those interactions believed to be made by automated agents or bots, (2) those interactions believed to be made by a human, and (3) those interactions which are unclear as to whether performed by a human or a bot. The best control groups for sets of elements of true human interaction arise from web browsers driven from authenticated locations in places with no reason for advertising fraud. The best control groups for sets of elements of bot behavior arise from the step of secondary, active detection of the present invention, as well as evaluation of "bot zoos" or other automated agent networks. Furthermore, for purposes of refinement of the classifiers in cases where pattern characteristics match both humans and bots, (i.e., where sessions match pattern characteristics of two or more of the three pattern databases), the present invention may either narrow the patterns to match only bots, or, alternatively, positively identify the humans and strip them out, thus leaving only the bots.

Before the process of differentiation begins, an individualized code snippet must be inserted into the HTML code of a given web page. When this code snippet is present in the code of a given web page and that page is accessed, performance metrics are sent to remote analysis servers via asynchronous HTTP posts. These metrics evaluate the behavior and performance of the entity that viewed or is viewing the given web page, and how that page was loaded. The code snippet is injected as JavaScript alongside an advertisement or other script load event. As the Internet is comprised of many such loads (or injections), this invention creates merely one more. For example, a performance metric based on a mouse event can be collected in the following manner: (1) Handlers and listeners are registered for a mouse event; (2) The handler receives the various timestamps and values associated with the mouse event; (3) The system then emits the raw timestamps and values, or a summary thereof, over the network. If no listener is registered, it would be impossible to recover this data from the ambient traffic.

Performance metrics for various visitors to a given web page containing the code snippet, as well as those for all web pages containing similar code snippets are compiled and aggregated by the remote analysis servers into reportable metrics, which in turn are made available to the operator of a given web page in a number of reporting mediums, including, but not limited to, password protected interactive HTML dashboards, exportable spreadsheet documents, and subscription based email and PDF reports, and may be used in real time to control access to a given web page.

After analysis of the differentials with regard to each database of properties, the performance metrics and probabilities that are reportable include, but are not limited to, the origin and destination of a visitor, the likelihood that the visitor was an automated agent or human, the likelihood of activity related to a particular type/class of bot or user (i.e. bot/user classification), the likelihood of an altered or misrepresented browser environment and whether the cause of such altered environment was malicious or benign, and a variety of variables that identify information, such as advertising data points, including, but not limited to, advertising campaign specific code, the advertising medium, the source ID and the advertising provider.

These metrics are evaluated in such a way by the remote analysis servers that the information presented to the operator of a given web page that has included a code snippet is presented with a qualitative evaluation of whether or not a given visit to that web page was or was not made by an automated agent, and in some cases, a further evaluation of the specific type of automation present and the type of altered environment and cause thereof. This process of evaluation entails the following: the code snippet sends "emit events" from various "plugins". These emissions (i.e. "emit events") are sent via a variety of network channels, not all of which are always available. The present channels used are <img> tags, XMLHTTPRequests with CORS (Cross Origin Resource Sharing), and IFrame Form Post events. Initially, IFrame Form Posts are used, since they are the most compatible. Secondly, if CORS is compatible, the system can be upgraded to CORS. Other channels include WebSockets and Same Domain XMLHTTPRequest (which requires use of a local iframe that is configured to speak cross domain, through a toolkit like EasyXDM).

Furthermore, the computational process required to determine the above performance metrics and ultimately evaluate whether a visitor is automated or human can be implemented either via batch processing or via stream processing. Batch processing can be more efficient and can collate metrics across several events. Stream processing can scale better than batch processing but it cannot, for example, use future data to inform past impressions of normality (because, at the time of decision, the future event has not yet occurred). With stream processing, near-real time evaluation of a given user can be achieved. Thus, although normality metrics are determined by the past only, stream processing allows for the use of transaction identifiers embedded in a particular measurement event to evaluate, within thirty seconds of the last time of a given user's interaction, whether or not that user was a bot or a human.

FIG. 1 gives one example of how the present invention may be deployed in a typical webpage scenario. First, a code snippet containing a unique identifier is inserted into the webpage 100. A user (human or automated) then requests the web page containing the code snippet 101. The web page containing the code snippet is loaded by the user 102. And as the user continues browsing normally 103, data regarding the user's interaction with the web page is sent to the analysis server 104, where the analysis server further analyzes the user data qualitatively 105. If the analysis server determines a sufficiently high probability of automated activity 106, such that a step of active probing/detection may occur without causing human user frustration, a second evaluation 107 may be performed, particularly for the purpose of detecting the following types of classifications and identifications: (1) Identification and classification of automated browser agents by type (i.e., not just bot versus human, but different classes of automated agents) (this may be performed via passive or active detection methods); (2) Identification of other forms of non-native code modifying the function of a browser, not just automating the browser (e.g., toolbars injecting content) (this is performed via active detection); and (3) Identification of network-resident modifications to the function of a browser, including proxies that alter an appearing origin of a browser, and network-resident content injection (this is performed via active detection). If the analysis server determines a sufficiently high probability of human activity 108, the second evaluation is not initiated.

Figure 2:
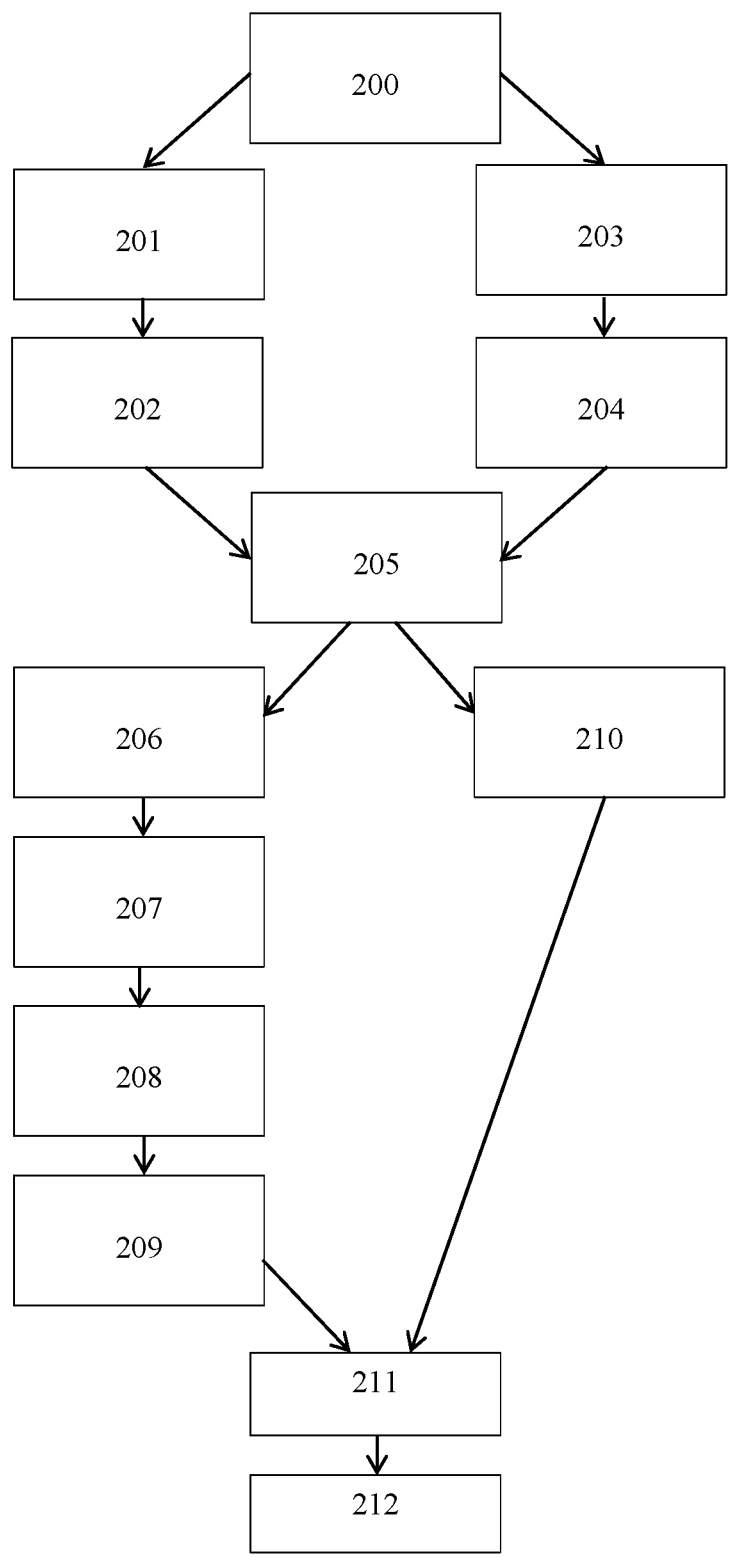
FIG. 2 illustrates an example of the process employed by the present invention to analyze internet traffic and determine whether a given user is a human or an automated agent.

FIG. 2 shows an example application of the repeatable process employed by the present invention to analyze internet traffic. The illustrated process is comprised of the following steps: Declare or collect customer (i.e. client) identifier, peer (i.e. who the customer would like to test against, e.g., publisher, advertisement location, secondary exchange, etc.) identifier, and transaction (i.e. the particular advertisement view) identifier 200; Load Loader GS 201 from analysis server; Script load of Signal Flare GIF 202 from analysis server; load Signal Flare GIF 203 from analysis server; load human monitor (pagespeed.js) 204 from analysis server; Report load succeeded, under state "init" with all available metrics to analysis server 205; If a human act is detected 206, immediately issue a second report (state "first") 207, wait six (6) seconds 208, and issue a final report (state "statecheck") 209; If no human act is detected 210, steps 207, 208, and 209 do not occur; Perform a qualitative analysis of available metrics and reports, if any 211; and Report a qualitative score for the Customer ID (session) 212.

Figure 3:
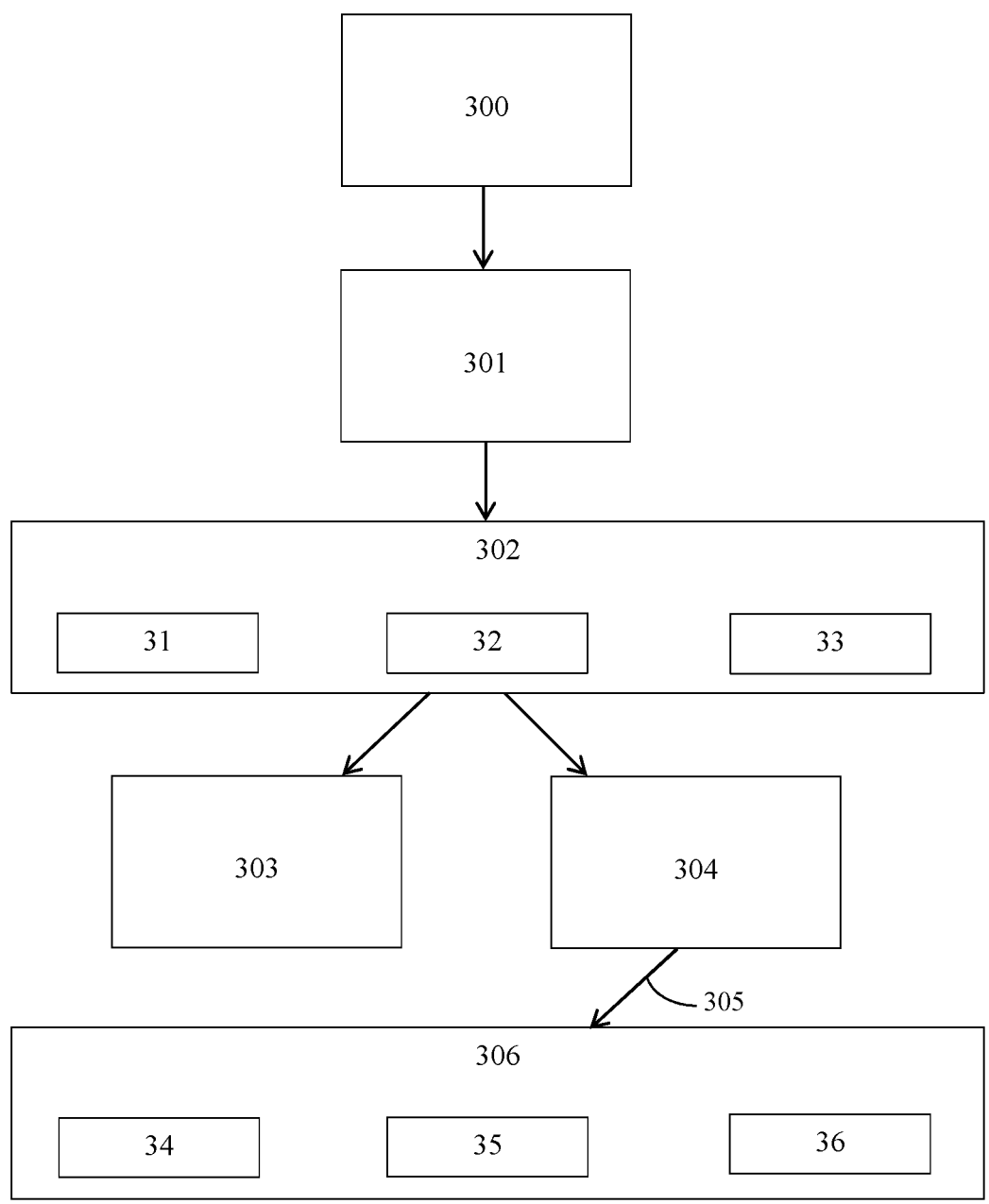
FIG. 3 illustrates the general data collection process of the present invention.

The process described above and illustrated by FIG. 2 is one example of the more general process employed and claimed by the present invention. Specifically, this broader process, shown in FIG. 3, occurs as follows: First, customer, peer, and transaction identifiers are collected 300; Next, these identifiers are embedded in an active probe, where the active probe (1) retrieves extra state from the client execution environment and (2) streams data back over multiple channels 301; Third, these actively probed characteristics are measured 302 against known and unclear properties contained in three types of databases (i.e. human characteristics 31, bot characteristics 32, unclear characteristics 33). The two main classes of characteristics probed and analyzed are (1) what channels or information is available and/or absent (note: the presence, or absence, of a channel is, by itself, a botprint source), and (2) the time it takes for properties/characteristics to be probed. The performed analysis measures the degree/amount of automation as well as the degree/amount of true human interaction, thus providing a probability of automated activity and a probability of human activity. Reports are issued (1) to the customer/client, reporting on the automation/bot percentage 303, according to the dimensions given in the peer identifier, and (2) to the server for further analysis and extra characteristics for more botprint generation 304. Furthermore, if said percentage of automated activity is determined, by the server, to be sufficiently high 305 that a human browser would not be affected by additional active probing, an additional step or steps of active (i.e., more intrusive) detection 306 may occur, allowing the system to evaluate and detect the specific class/type of automation 34, forms of non-native code modifying the functions of a browser 35, and/or network-resident modifications and content injection affecting the functions of a browser 36.

The following sets forth certain examples of how specific metrics can be evaluated to achieve reportable results:

Location Evaluation: Using the data gathered as set forth above, a method has been invented to probabilistically, statistically and directly evaluate the location of clicks on a given web page executed during a given visit to a web page, and by doing so, evaluate, or contribute to a statistical model for the purposes of evaluating if that given visit was or was not made by an automated agent.

Interclick Timing Evaluation: Using the data gathered as set forth above, a method has been invented to probabilistically, statistically and directly evaluate the timing between clicks on a given web page during a given visit, as well as to use such interclick timing to identify or determine information about a given user or class of users. Such timing can provide a "fingerprint" of a given user's desktop and/or patterns of Internet browsing for the purpose of evaluating or contributing to a statistical model designed to evaluate if a given visit was or was not made by an automated agent, as well as for many other purposes.

VPN and Remote Desktop Interclick Timing Evaluation: Using the data gathered as set forth above, a method has been invented to perform Interclick Timing Evaluation even if a given browsing session actually traverses a virtual private network and/or remote desktop connection by relying upon the fact that mouse, keyboard and click commands must be transmitted over such connections at a fixed read rate.

Motion and State Related Mobile Automated Agent Detection: Using the data gathered as set forth above, several methods have been invented to determine whether or not a given browsing session that originates or appears to originate from a browser or application running on a mobile device, such as a smart phone or tablet, is being carried out in whole or in part by an automated agent. For example, HTML5 allows gyroscope and accelerometer readings to be taken "zero click," or without any active engagement with a web page by a user, and scroll information may be similarly read. The mere presence of information such as this, related to the position of the mobile device in space, and the engagement of the user with the interface of the mobile device, is deterministic of whether or not a human is present. Changes to information such as this, and the nature of such changes, may reflect the precise environment the device claims to be in, and evaluation of such information, its presence, absence or changing nature, may be used for the purpose of evaluating or contributing to a statistical model designed to evaluate if a given visit was or was not made by an automated agent, as well as for many other purposes.

IP and Geolocation Related Mobile Automated Agent Detection: The methodologies set forth above may be further supplemented by evaluating the IP address, purported geolocation and other more static data related to a given device and its user, both on its own and in reference to the data gathered in Motion and State Related Mobile Automated Agent Detection, for the purpose of evaluating or contributing to a statistical model designed to evaluate if a given visit was or was not made by an automated agent, as well as for many other purposes.

Time Based IP and Geolocation Related Mobile Automated Agent Detection: The IP and Geolocation Related Mobile Automated Agent Detection information set forth above may be further evaluated over long time frames, and compared to other such data, for the purpose of evaluating or contributing to a statistical model designed to evaluate if a given visit was or was not made by an automated agent, as well as for many other purposes.

Data Hiding and Separation: Perhaps the most efficient mechanism for deploying code for the purposes of determining whether a given browsing session is being performed by an automated agent, as well as to perform many other types of useful evaluations of web browsing events, is to cause a web page to in turn cause evaluative processing to be performed on the computer or other device that is in fact doing the browsing, and once such processing is completed, to transmit its results to a remote machine for further evaluation. Rather than being maximally efficient, a methodology has been invented that, while less efficient, is more secure and less likely to be detected, wherein a variety of metrics, useful for the instant purpose, but also useful for a number of other normal analytical purposes, are collected and transmitted to the remote server for evaluation. Thus, uncertainty is created as to which specific aspects of the data are actually being evaluated and for what purpose, and those malicious actors involved in creating and using automated browsing agents are less likely to and will require more resources to determine that any such evaluation is taking place.

Rendering Differential Evaluation: In addition to evaluating user interaction, it is also possible to evaluate how long various actions take to execute. When a human is in the loop, it is necessary that a web browser engage certain aspects of a computing device's hardware, including graphics hardware, sound hardware and the like. The amount of time to complete certain actions is dependent on whether such hardware is actually being engaged and to what degree (for example, whether the graphical action is opaque or semi-transparent). Certain factors further differentiate the amount of time taken, such as whether or not the browser must "reflow" the page, resulting in a predictable sequence of redraw events. This amount of time varies based on the nature of the screen, and most importantly, may be used to differentiate between an unaccelerated screen (a "virtual frame buffer") or a real screen.

Jitter Evaluation: The amount of "jitter" (as opposed to absolute time) witnessed is a further indication of whether a given system is doing a given task in the foreground or the background.

VM Timeslicing Analysis: It is possible to determine if Virtual Machine Timeslicing is occurring by the evaluation of rendering delays (i.e. by way of quantization of time potentials, as may be seen through repeated calls to millisecond timers in JavaScript).

Cache Validation: It is possible to use the behavior of web browser cookies and caches, particularly over time, to differentiate between human and automated browsers, especially if one browser is being driven across many destinations.

There are many applications for the presently claimed invention. In one application, the present technology integrates with financial anti-fraud (in a "send money" or a "shopping cart checkout" context). Another application of the present invention is for a pre-CAPTCHA signup auditor. It should be noted that the claimed system does not directly block a signup; it instead flags accounts that CAPTCHA systems are not noticing or catching. The claimed invention operates as an independent metric. It also operates as an excellent system for finding malware on internal enterprise networks, as most intranets use internal sites that attackers remotely browse. The system can detect that attackers are not actually the users they claim to be, even if and especially if they are tunneled through a machine on the corporate network.

The following sets forth additional examples of other general exemplary applications of the present invention, applicable to a wide range of fields and industries:

Engagement Evaluation: The data gathered as set forth above is especially useful as a tool for determining whether or not an automated agent is carrying out a given browsing session. This is not, however, its only use. The data gathered by each of the methodologies set forth herein may also be used where a browser is being driven by a human being and not an automated agent to determine how that user interacts with a web page and its various aspects, resulting in a measure of that user's engagement with that web page and its various aspects, both in a given browsing session, and in comparison to previous and future browsing sessions.

Botprinting: Different automated agents expose themselves in different ways. The evaluation of the information exposed by different automated agents, and gathered as set forth above, and/or gathered by any number of other methods, such as IP addresses, failure modes, level of JavaScript support, allows for their comparison and for the comparisons of the signatures of all agents evaluated. Such "Botprints" may be used to evaluate trends in the use of automated agents, to track their development and spread, and for any number of other purposes.

Evaluation of Browser Errors: The information delivered by the methods set forth above relating to browser errors may be used effectively to determine whether or not a given browsing session is being carried out by an automated agent. For example, it is possible to mine excess metrics and to intentionally cause JavaScript errors so that the error responses generated may be used to distinguish between automated agents and human browsers. When a command fails, this failure is caught, inside of a catch/try construction. This information is caught by the JavaScript of the presently claimed invention instead of being transmitted to the developer console. Suppose, for example, that a browser is a Chinese-speaking browser but is hiding the fact that they are Chinese-speaking. The browser errors caught by the present system and method will still be in that language (i.e. Chinese).

A-B Evaluation: It is known that different campaigns have different effectiveness on different audiences. Automated agents, however, are not driven by the same factors as human beings, and will not respond to different campaigns in the same manner as human beings will. When the technology set forth herein is deployed across different advertising campaigns, the comparison of differing responses by different sources of browsing traffic may be used as an active mechanism to detect or supplement the detection of automated behavior. Such comparison remains effective even when humans are used in place of automated agents for the purposes of carrying out advertising fraud.

Stochastic Signature Evaluation: The automated agent detection methodologies set forth herein need not be exposed on every web page or every load of a given page, nor do the same mechanisms need to be used each time or all the time. Mutation of the deployed JavaScript, in both location and style, significantly raises the cost of operators of automated agents success and limits their ability to develop and deploy effective countermeasures to the methods set forth herein.

Evaluation in terms of Cost Per Human: Rather than evaluating web traffic and specifically advertising campaigns in terms of metrics such as cost per click, cost per thousand clicks, or cost per action, the present invention allows and contributes to the evaluation of such traffic in terms of a much more meaningful metric: cost per human ("CPH"). Rather than measuring clicks or other events that may or may not be generated by an automated agent, evaluation of CPH allows a much more meaningful determination of the effectiveness of amounts spent to attract traffic to a given web page. CPH is a better, more meaningful metric because the ultimate point of online advertising is not to serve "impressions" per se, but rather to show advertisement impressions to human beings specifically. CPH reflects the cost of reaching real humans by calculating advertising costs in terms of dollars spent per human reached, instead of dollars spent per impression served to anything, human or bot. CPH can be calculated as follows, for example. CPH=total advertisement spending divided by total human impressions obtained with that spending, multiplied by 1,000 (one thousand) to scale to the traditional measure, CPM (cost per M, i.e., cost per thousand). If an advertisement were shown 1,000 times for $10, the CPM of those impressions would equal $10. If, of those 1,000 impressions, 600 were shown to bots and only 400 to humans, the CPH would equal $25.

Heatmap Signature Evaluation: When a human being is present in a browsing session, the invention contained herein may be used to evaluate mouse and keyboard usage patterns so that for each such user, a pattern signature may be determined, assuming that the settings of that person's browser allow for such information to be gathered. Such signatures may be used for a number of purposes, such as targeting specific content to specific human users.

Heatmap Signature Correlation: With a sufficient number of heatmap signatures collected, it is possible to compare usage models across large numbers of websites and thus to detect insufficient or non-human variation models, with more data than an operator of automated agents may possess. It should be noted that while collecting heatmap signatures regarding where a given browser is clicking might be widely known, very detailed analysis of actual mouse events is much less widely known in the field of this invention. Furthermore, while the collection of inhuman movement patterns and incomplete event firings (like mouse down and mouse up, but no click on a non-mobile device) might be known by a few experts, collection of mouse event rates and malformed events is novel in the field.

Global Visibility: With the widespread deployment of the methodologies set forth herein, not only into destination sites, but also into the JavaScript that hosts the clicks itself, it is possible to measure rates of automated agent action not merely on sites that have actively deployed the necessary code snippet, but for effectively all sites that are able to deploy such a code snippet. Done properly, this methodology can provide a statistically significant sampling of all click fraud on the Internet, and thus provide global visibility with regard to automated browser action, and not just visibility into sites running our code snippet.

Source Page Embedding: By embedding the inventions set forth herein in the page from which a given click originates (the "source page"), interaction is guaranteed regardless of the nature of the visitor, since by definition a click requires interaction. Source page embedding external to an iframe, or inline frame, further allows monitoring of other advertising campaigns or content placed on a given source page without requiring the involvement of the parties placing such content.

Embed Locations: The technology described herein may be placed in the destination page inside an iframe on the page from which a click to be evaluated originated, or outside an iframe on the page from which a click to be evaluated originated, which not only takes advantage of the inherent benefits of each type of placement, but also allows for monitoring of the "total click lifecycle," or the sequence of events commencing with the presentation of a specific piece of content as part of the loading of a given web page, and continuing through a given user's interaction with and clicking of that specific piece of content, through any subsequent pages visited and pieces of content interacted with, and ending with either the abandonment of the browsing session, or a conversion event.

Real Time Filtering: The inventions set forth herein may be used to provide a given website, ad, ad campaign or other such user with real time filtering, and to effectively prevent automated agents from reaching their destinations. Such real time filtering can be as fast as 50 (fifty) milliseconds, although certain tests performed by the present invention offer a result only after a given page is "complete." In the latter case, a metric of "120 seconds since the last time that given page sent the system any data" is used. Additionally, the present invention can force a client code to stop sending data after 120 seconds. A few bots fail to honor the 120 second cut off and thus are easily identifiable.

Demand Service Provider Metrics: Advertising industry Demand Service Providers generate income by exploiting arbitrage opportunities with regard to the placement of online advertisements. By using the invention set forth herein to generate real time quality, engagement, CPH or other related metrics related to any such opportunity, it will allow for more effective evaluation of such opportunity.

Realtime Ad Purchase Metrics: Specifically, with regard to the foregoing, it is possible to determine in realtime whether or not a given ad should be placed or displayed for a given IP, making it possible to not only detect but proactively prevent fraudulent or otherwise unwanted clicks.

Browser Validation: A web browser's user agent (i.e. the type of web browser currently being used) may be misrepresented, or "spoofed," both by its HTTP source and/or by the content of the JavaScript DOM. The inventions set forth herein may be used to detect such spoofing by using browser version specific metrics.

Load validation: For efficiency, some content may not be loaded by automated agents. The inventions described herein may be used to detect such missing loads.

Proxy Detection: It is possible to alter the behavior of the evaluating server based on whether a proxy is in place. The manner in which all other metrics are evaluated may be altered based on the behavior of these intermediary nodes.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for detecting automated browser agents, comprising:
  initiating a primary detection comprising passive probing, said primary detection comprising the steps of:
    inserting a means for detecting information into a page code before a page is sent to a user's browser, sending said page to a user's browser, wherein said means sends emissions from one or more plugins via one or more channels, said emissions capturing client execution environment data without requiring a browser interaction and causing immediate and continued data collection of said client execution environment data,
    transmitting via asynchronous posts said client execution environment data to an analysis server, wherein said analysis server compares said client execution environment data with a first database storing pattern characteristics for humans, a second database storing pattern characteristics for automated browser agents, and a third database storing pattern characteristics which are unclear as to whether performed by a human or a bot,
    forming a report on automated browser agent activity based on a qualitative evaluation of performance metrics collected,
    calculating a probability of the user being an automated browser agent, said probability being based on said report and said comparing with said three databases, and
  initiating a secondary detection if said probability of the user being an automated browser agent guarantees a presence of automated agent activity, said secondary detection comprising active probing.

2. The method of claim 1, further comprising calculating a second probability of the user being a human.

3. The method of claim 1, wherein said secondary detection comprises detection of properties to classify automated agents by type.

4. The method of claim 1, wherein said secondary detection comprises detection of non-native code modifying a function of a browser.

5. The method of claim 1, wherein said secondary detection comprises detection of network-resident modifications to a function of a browser.

6. The method of claim 1, wherein said secondary detection comprises detection of content injection.

7. The method of claim 1, wherein said client execution environment data comprises emulated input.

8. The method of claim 1, wherein said client execution environment data comprises JavaScript event loops.

9. The method of claim 1, wherein said client execution environment data comprises a nature of character insertion.

10. The method of claim 1, wherein said client execution environment data comprises optimization of JavaScript.

11. The method of claim 1, wherein said client execution environment data comprises an ability to connect with a malware detection engine.

12. The method of claim 1, wherein said client execution environment data comprises post-exploitation defenses.

13. The method of claim 1, wherein said client execution environment data comprises data regarding a handling of cookies.

14. The method of claim 1, wherein said client execution environment data comprises properties of TCP and UDP traffic.

15. The method of claim 1, wherein said client execution environment data comprises an availability of server-side API technology.

16. The method of claim 1, wherein said active probing comprises an active use of pop-ups.

17. The method of claim 1, wherein said active probing comprises intrusive font detection.

18. The method of claim 1, wherein said active probing comprises nonlinear sampling.

19. The method of claim 1, wherein said active probing comprises forcing a bot to self-announce to arbitrary endpoints.

20. The method of claim 1, wherein said secondary detection comprises detection of viewability modulation.

\* \* \* \* \*